United States Patent [19]

Tamiya

[11] Patent Number: 4,932,014
[45] Date of Patent: Jun. 5, 1990

[54] DATA RECORDING AND READING SYSTEM

[75] Inventor: Toshihiko Tamiya, Hadano, Japan

[73] Assignee: Hitachi, Ltd., Tokyo, Japan

[21] Appl. No.: 153,200

[22] Filed: Feb. 8, 1988

[30] Foreign Application Priority Data

Feb. 12, 1987 [JP] Japan .................................. 62-28112

[51] Int. Cl.$^5$ .............................................. G11B 15/52
[52] U.S. Cl. ..................................................... 369/48
[58] Field of Search ....................... 369/47, 48, 49, 59; 360/48

[56] References Cited

U.S. PATENT DOCUMENTS

| 4,001,883 | 1/1977 | Strout et al. | 360/48 |
| 4,456,933 | 6/1984 | Schneider et al. | 360/49 |
| 4,733,386 | 3/1988 | Shimoi | 369/47 |

FOREIGN PATENT DOCUMENTS

| 3611561 | 10/1986 | Fed. Rep. of Germany . | |
| 52-25023 | 9/1978 | Japan . | |
| 58-41444 | 3/1983 | Japan | 369/47 |
| 60-217567 | 10/1985 | Japan . | |

OTHER PUBLICATIONS

J. Flores, Peripheral Devices, Prentice Hall, Inc., 1973, p. 301.
Lexikon der Datenverarbeitung, 4th edition, 1969, Verlag Moderne Industrie, pp. 99-101.

*Primary Examiner*—Vincent P. Canney
*Attorney, Agent, or Firm*—Antonelli, Terry, Stout & Kraus

[57] ABSTRACT

A data recording and reading system includes a recording medium having a plurality of fixed length recording units, recording units for recording data and associated data recording information indicating the record status of the data in the recording medium, and reading units for reading the data recorded in the recording medium. In the data recording and reading system, the data recording information includes a data flag indicating if data has been recorded on the recording medium, and a data length indicating the length of the recorded data.

18 Claims, 5 Drawing Sheets

FIG. IA
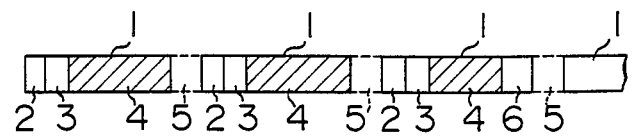
FIG. IB
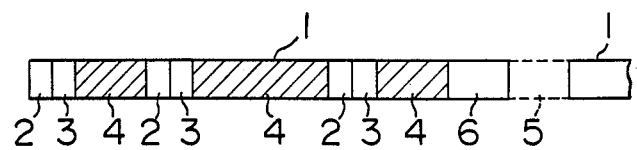
FIG. IC
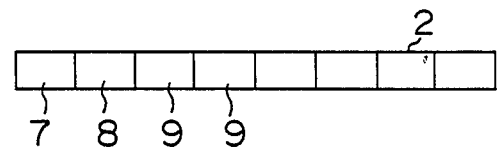
FIG. 3
PRIOR ART
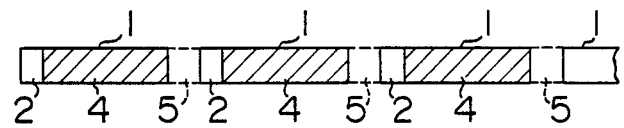

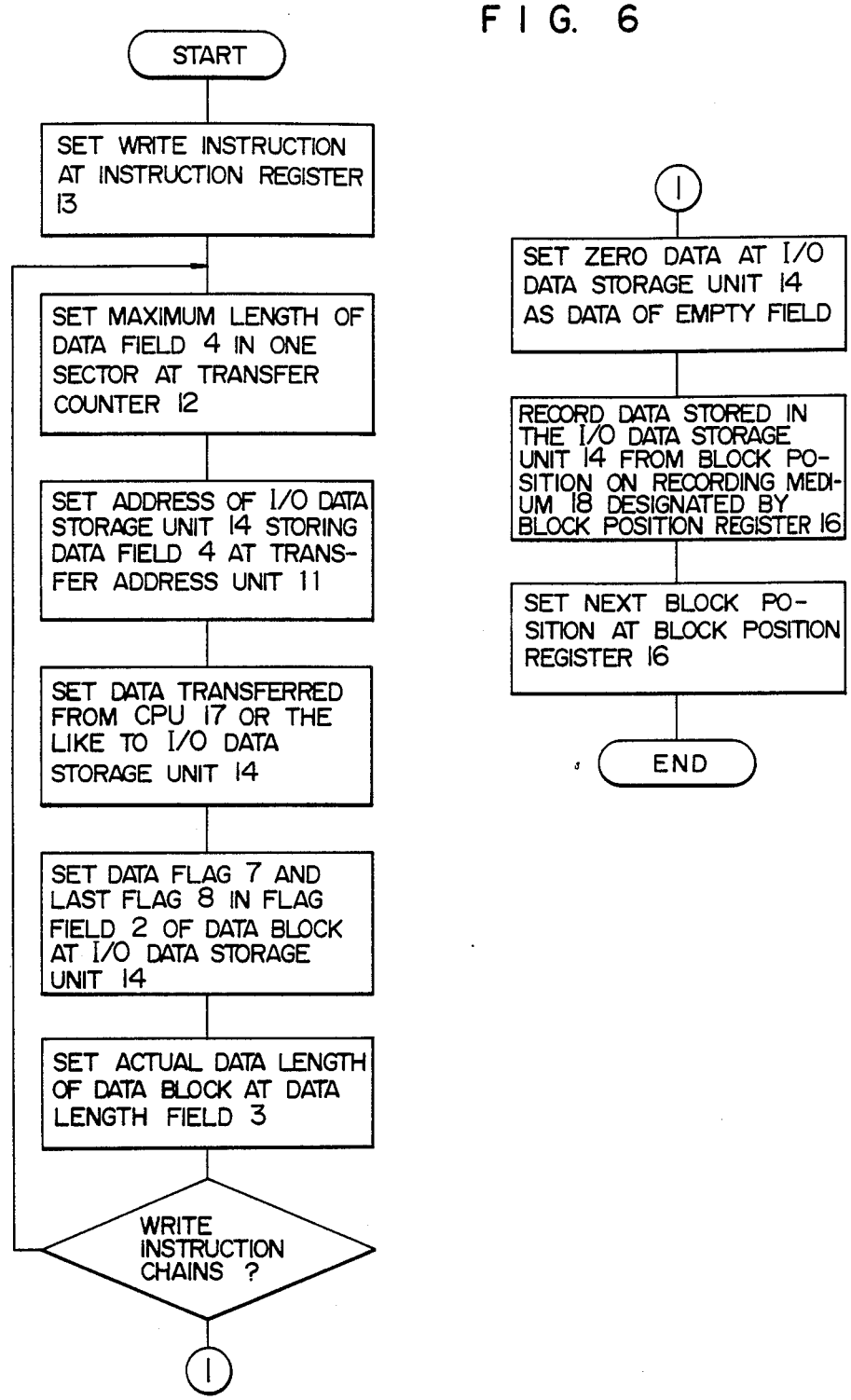

DATA RECORDING AND READING SYSTEM

BACKGROUND OF THE INVENTION

The present invention relates to a data recording and reading system for use with a recording medium having a plurality of fixed length recording units, which system is particularly suitable for recording variable length data.

Optical disk devices have been developed recently as information recording devices of large capacity in which data is recorded, erased and reproduced by means of magnetooptical interaction between heating by a laser beam and a magnetic field. The medium of an optical disk device usually adopts fixed length recording units. As a recording method for such a fixed length recording unit, there is known a sector system which is used especially for a small sized magnetic disk device. As is well known, a sector is composed of an ID field and a data field. A track number and a sector number are recorded in the ID field, and data is recorded in the data field. It is common that data for the ID field of an optical disk medium is recorded in advance, such as at the time of manufacture of the disk.

U.S. Ser. No. 847,167 filed on April 2, 1986 now U.S. Pat. No. 4,760,566 discloses a data recording system in which a flag together with the above-described track number and sector number is provided at each sector, the flag indicating if data has been recorded in the sector or not.

Similar to a magnetic disk device, an optical disk device sometimes records one block of data in a plurality of sectors. As a recording method capable of correlating a plurality of sectors with a block, a method is disclosed in Japanese Patent Publication No. JP-A-53-110510 in which each one of a start sector, one or more intermediate sectors and a last sector has a flag identifying the start, intermediate and last sectors in the data field thereof.

According to this method, as shown in FIG. 3, each sector 1 has a flag field 2 and a data field 4 and the sectors are separated by a gap field 5. In the case shown in FIG. 3, one block of data is recorded divisionally in three sectors 1. One block of data divisionally recorded in three sectors is continuously read in response to a single read instruction. The length of the read-out data is equal to three times the sector length less three times the flag field length.

This method, however, requires that the total data length be an integer multiple of the data length recorded in a sector. If not, one block terminates at and intermediate part of a sector. Thus, the end of the block cannot be identified by the read-out data, i.e., it is not certain to what extent the effective data continues. In such a case, it is possible to discriminate the boundary of the end of the effective data and the data empty field by means of processing the read-out data by a CPU. However, this results in a corresponding load on the CPU. Apart from the above, if a plurality of blocks each having a short data length are recorded in one sector, it becomes difficult to read an arbitrary block in the sector because the reading is carried out in units of a sector. Thus, the above-described prior art poses a difficulty of dealing with data having an arbitrary length.

SUMMARY OF THE INVENTION

It is an object of the present invention to provide a data recording and reading system for a recording medium having a plurality of fixed length recording units, which system can record and read data having an arbitrary length.

It is another object of the present invention to provide a data recording and reading system capable of reduces the burden of processing data having an arbitrary length and which is capable of being recorded on a recording medium having a plurality of fixed length recording units.

According to the present invention, when one block is to be recorded in one or more recording units, the length of the data recorded in each recording unit is recorded in each recording unit, whereas when a plurality of blocks are to be recorded in one recording unit, the length of each block of data is recorded in each block. Thus, by clearly defining to what extent an effective data block continues, data of an arbitrary length can be recorded on a recording medium having a plurality of fixed length recording units.

BRIEF DESCRIPTION OF THE DRAWINGS

FIGS. 1A, 1B and 1C show recording formats of sectors associated with the present invention.

FIG. 3 shows a conventional recording format.

FIG. 6 is a flow chart showing another embodiment of a data writing method according to the invention.

DESCRIPTION OF THE PREFERRED EMBODIMENTS

Figure 2:
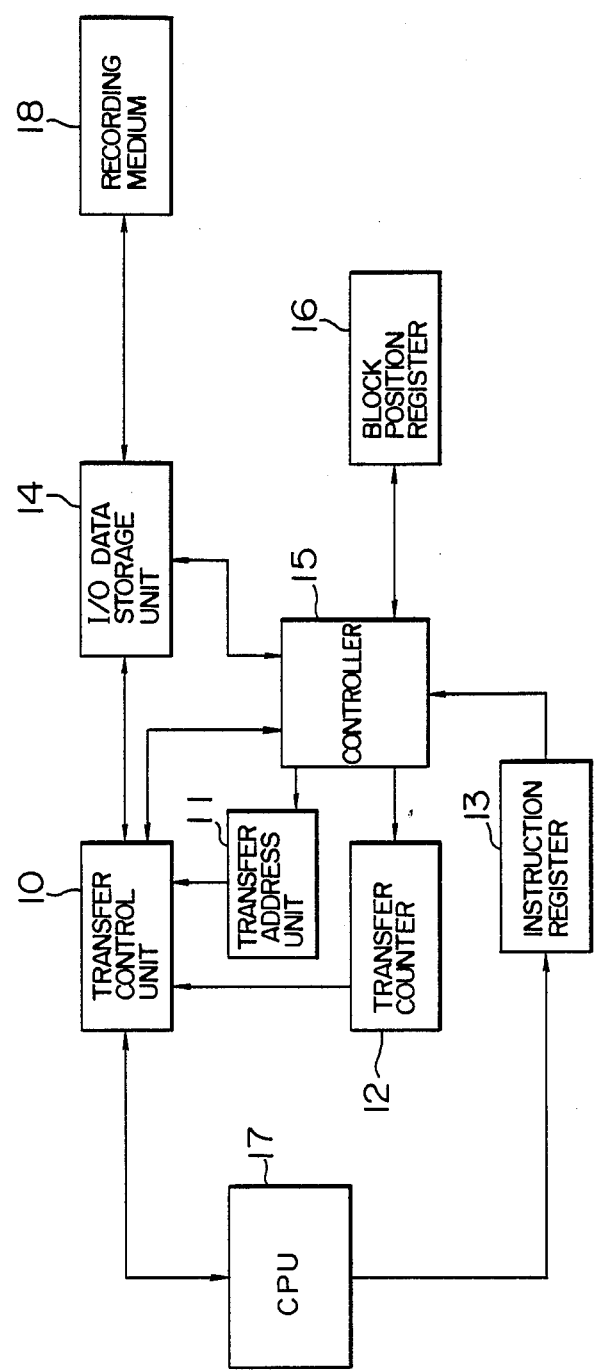
FIG. 2 is a block diagram showing an embodiment according to the present invention.

Preferred embodiments of the present invention will be described with reference to the accompanying drawings.

In FIGS. 1A and 1B, reference number 1 denotes a sector corresponding to a fixed length recording unit, 2 a flag field in which information representative of the status of data recorded in the associated sector is recorded, 3 a data length field which indicates in units of a byte the length of data recorded in a data field of the associated sector, 4 a data field, 5 a gap field between sectors, and 6 an empty field wherein data was not recorded in the associated sector.

FIG. 1C illustrates a detailed flag field shown in FIGS. 1A and 1B. In FIG. 1C, reference number 7 denotes a data flag indicating whether data is present or not, 8 represents a last flag which indicates the last sector among sectors over which one block data has been recorded, and 9 identifies a mark flag which indicates an intersection between data or the end of a file. If a mark flag is constructed of two bits, it is possible to indicate the intersection between data by one bit, and the end of a file by two bits.

In the embodiment shown in FIG. 1A, one block of data is recorded in three sectors. A data flag 7 of the flag field 2 shown in FIG. 1 is set for the start and intermediate sectors, while a data flag 7 and a last flag 8 of the flag field 2 are set for the last sector. The length of data recorded in each data field 4 of the associated sector is recorded in units of a byte in the corresponding data length field 3. On the condition that data is recorded in the whole area of the data fields 4 of the start and intermediate sectors, the data length may be recorded only in the last sector.

In the embodiment shown in FIG. 1B, three blocks are recorded in one sector. The data flag 7 and last flag 8 are provided in the flag field 2 of each block.

In the embodiments shown in FIGS. 1A and 1B, a flag bit or mark indicating the intersection between files each constructed of a block assembly is recorded at the last block or the last fraction thereof having a flag bit indicating the last data, and in addition the position of the sector in which the flag bit or mark is recorded is recorded at a predetermined sector. It becomes possible accordingly to search for an intersection of a desired file by first reading the position of the sector, in which the flag bit or mark indicating the file intersection is recorded, from the predetermined sector, and skipping directly to the objective sector. Thus, by using the flag bit or mark in a manner similar to a well-known tape mark of a magnetic tape, it becomes possible to emulate the data format of a magnetic tape. Therefore, a sequential access similar to the case of a magnetic tape can be realized for a recording medium, such as an optical disk having a plurality of fixed length recording units.

Alternatively, in the embodiments shown in FIGS. 1A and 1B, a flag bit or mark indicating the intersection between files (block assemblies) may be recorded at the next block to the last block or the last fraction thereof having a flag bit 8 indicating the last data. By using the flag bit or mark in a manner similar to the case of a tape mark, a sequential access can be realized for a recording medium such as an optical disk having a plurality of fixed length recording units.

FIG. 2 is a circuit diagram embodying the method of the present invention in accordance with which data is recorded in a recording medium and the recorded data is read out of the medium.

Referring to FIG. 2, reference number 10 denotes a transfer control unit for controlling data transfer, 11 a transfer address unit for giving the transfer control unit, 10 a destination of data transfer, and 12 a transfer counter for defining the amount of data (the number of bytes) to be transferred to the transfer control unit 10. The transfer control unit 10 determines the location and length of data to be transferred with the help of the transfer address unit 11 and the transfer counter 12. Reference number 13 denotes an instruction register which stores a read instruction, a write instruction and the like supplied from the CPU 17 and the like, 14 identifies an input/output (I/O) storage unit which stores data read into and outputted from a recording medium 18, 15 identifies a controller which controls the whole circuitry, and 16 represents a block position register which is used to correlate an instruction from the CPU 17 and the like with the recording position of a block to be recorded and read in accordance with the instruction.

The controller 15 sets an address data length data in a data field corresponding to the data length field respectively stored in the I/O register 14 into the transfer address unit 11 and the transfer counter 12, respectively. The block position register 16 stores an address of a start sector on the recording medium of a block whose data is transferred in response to a write instruction or a read instruction, or when a plurality of blocks are recorded in one sector it stores the address of the sector and the position of a block to be read from the recording medium.

The address of a sector identifies the track number and sector number, while the position of a block in one sector identifies the block number among the plurality of blocks in one sector.

Figure 4:
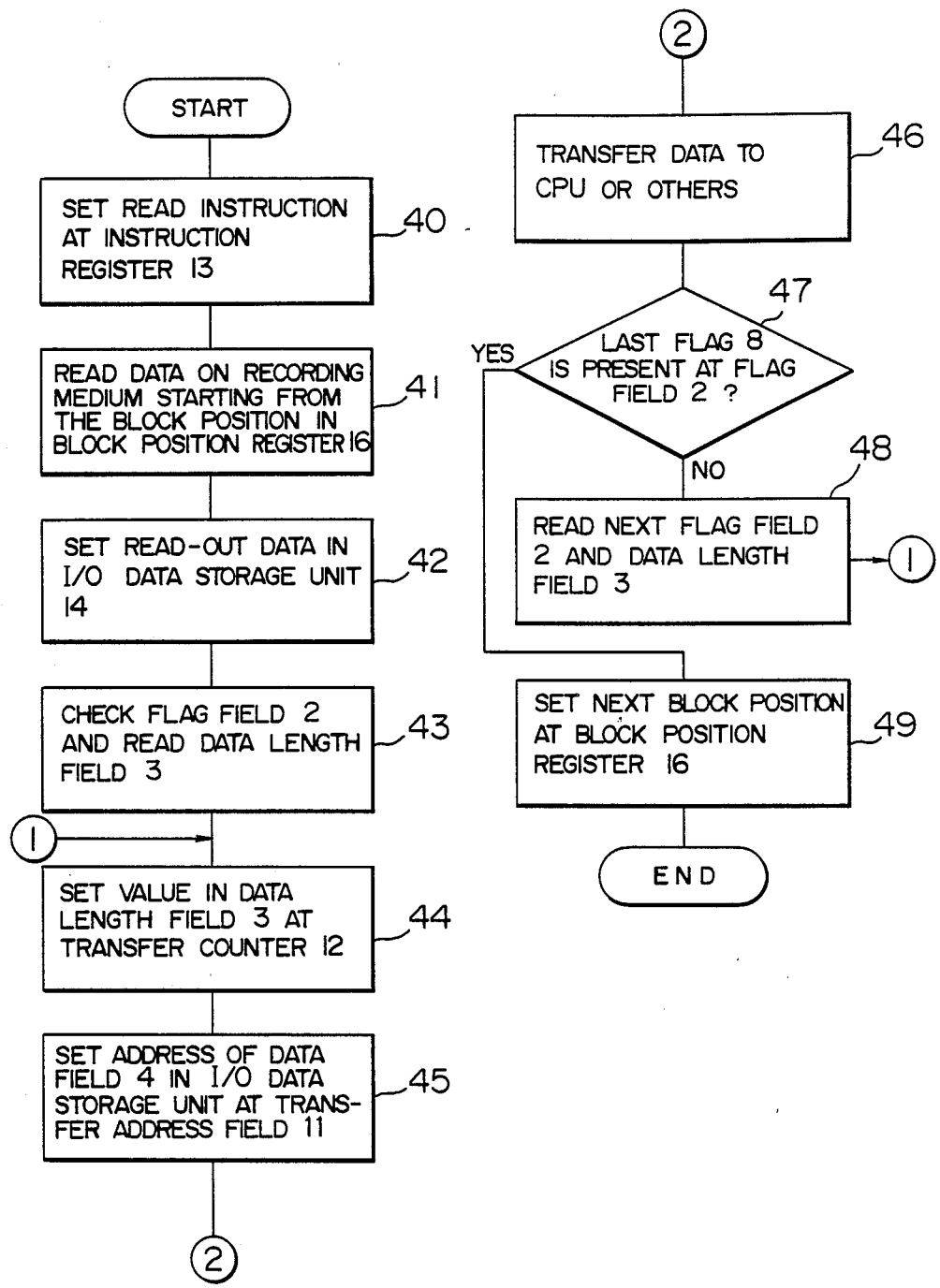
FIG. 4 is a flow chart showing an embodiment of a data reading method according to the invention.

Next, reading data in this embodiment will be described with reference to FIGS. 2 and 4.

Referring to the data recording and reading circuit shown in FIG. 2, an instruction issued from the CPU 17 or the like is set in the instruction register 13 (step 40). If the instruction is a read instruction, the controller 15 causes the data from the sector designated by the block position register 16 to be read from the recording medium (step 41), and causes the read-out data to be set in the I/O data storage unit 14 (step 42).

The controller checks the flag field 2 of the block in the I/O data storage unit 14. If the data flag 7 is set in the flag field 2, the data length in the data length field 3 of the block is set into the transfer counter 12 (step 44) and the start address of the data corresponding to the data field 4 of the information stored in the I/O data storage unit 14 is set into the transfer address unit 11 (step 45). The transfer control unit 10 transfers the data corresponding in amount to the data length and starting from the top of the data designated by the transfer address unit 11, i.e., the amount of the data to be transferred being only the data in the data field 4 (step 46). It is judged if the last flag in the flag field 2 is set or not (step 47). If not the next flag field 2 and data length field 3 are read (step 48).

The above operation of searching the flag field 2 and transferring the data field 4 is repeated starting from the first sector whose data flag 7 is set, to the sector whose last flag 8 is set. Consequently, it is possible to transfer the data of one block in response to one read instruction. After completion of reading one block, the controller 15 sets the position of the next block into the block position register 16. In the above operation, it is noted that if the data flag 7 is not set in the flag field 2 or if the mark flag 9 is set in the flag field 2, then the controller 15 judges, an abnormality, since the sector designation by the block position register 16 is in error.

If the last flag 8 is found to be set at step 47, the position of the next block is set in the block position register 16 to wait for a next read instruction (step 49).

If the empty field 6 is arranged to be recorded with all zero data and if the data at the position designated by the flag field 2 is found to be zero during the search of the flag field 2, then the data is judged as the empty field 6. In this case, the next flag field 2 is located at the top of the next sector.

Figure 5:
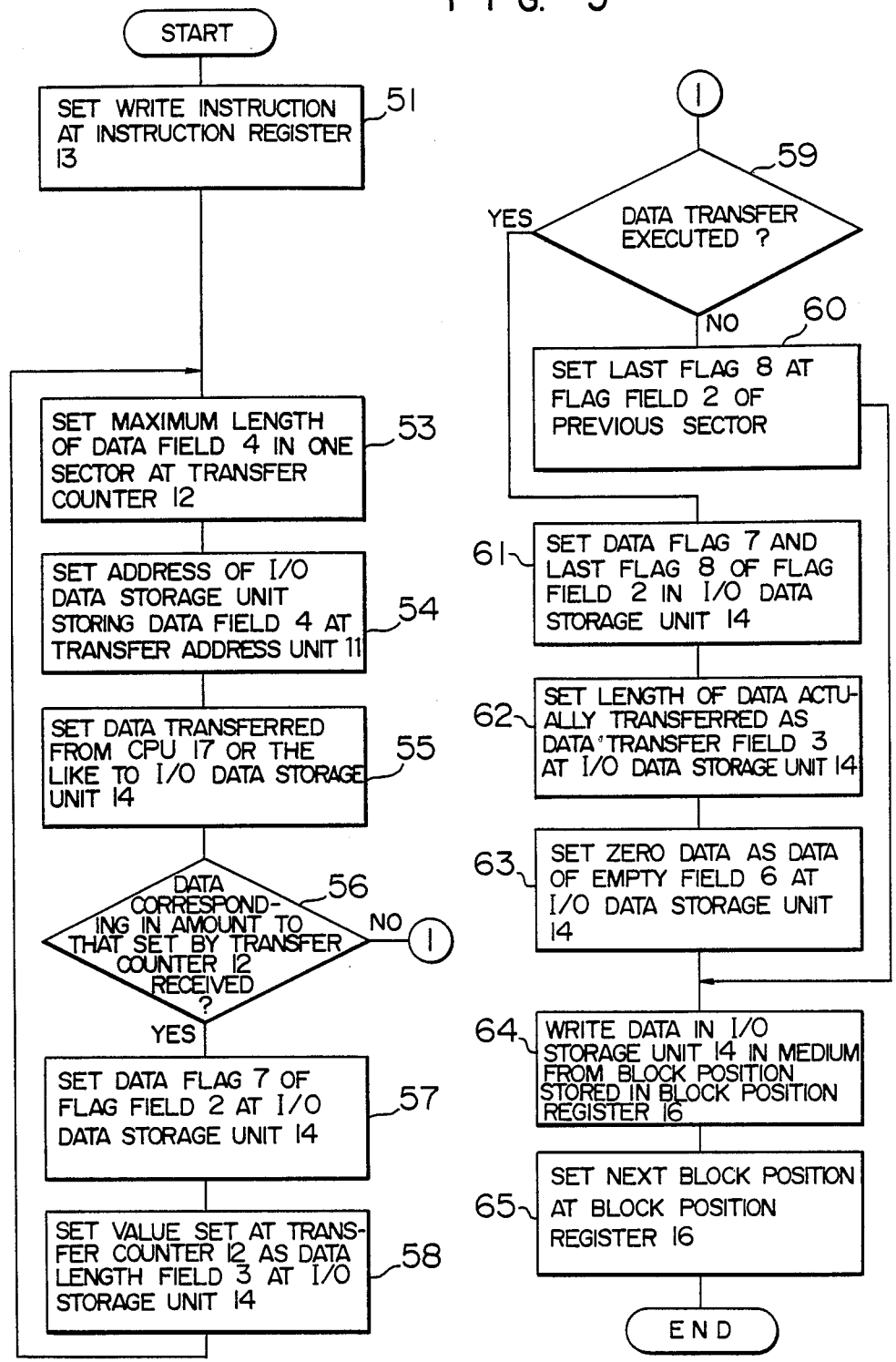
FIG. 5 is a flow chart showing an embodiment of a data writing method according to the invention.

Next, the method of recording data in the recording medium will be described. In order to simplify the description, the description is directed to the case where one block is recorded divisionally in a plurality of sectors as shown in FIG. 1A while referring to FIGS. 2 and 5.

In the data recording and reading circuit shown in FIG. 2, an instruction issued from the CPU 17 or the like is set into the instruction register 13 (step 51). If the instruction is a record instruction, the controller 15 sets in the transfer counter 12 the length of the data field 4 obtained by subtracting the lengths of the flag field 2 and the data length field 3 from the sector length (step 53). The address of the I/O data storage unit 14 for storing data is set in the transfer address unit 11 (step 54), and the data transferred from the CPU 17 or the like is set into the I/O data register 14 (step 55). It is checked if the data corresponding in amount to the data amount set by the transfer counter 12 has been set in the I/O data register 14 (step 56). When the data corresponding in amount to the data amount set by the transfer counter has been transferred, the data flag 7 of the flag field 2 is set in the I/O data storage unit 14 (step 57). Next, the value set in the transfer counter 12 is set in the I/O data storage unit 14 as the data length (step 58) to return to step 53. The data following the just received data is received from the CPU 17 or the like in a similar manner as above. The controller 15 repeats the above operation until the data to be transferred becomes smaller than the length set in the transfer counter, to thereby set one block of data in the I/O data storage unit 14.

If it is judged at step 56 that the transferred data is smaller than the length set in the transfer counter 12, then the controller 15 judges if data transfer has been executed or not (step 59). If affirmative, the data flag 7 and last flag 8 of the flag field 2 are set (step 61), and the length of the data actually transferred is set as the data length field 3 at the I/O data storage unit 14 (step 62) while at the same time zero data as the empty field 6 is set in the I/O data storage unit 14 (step 63).

If it is judged at step 59 that data transfer has not been executed, the last flag 8 is set in the flag field of the previous sector (step 60).

Upon completion of the above steps, the data set in the I/O data storage unit 14 is recorded on the recording medium from a position stored in the block position register 16 (step 64). Then, the position of the next block is set in the block position register 16 (step 65).

If an instruction from the CPU 17 is a forward space file instruction, i.e., an instruction to skip blocks to the intersection of block assemblies (files) on the recording medium, a particular sector is searched which stores an address of a sector containing the flag field 2 set with the mark flag 9. Then, the position of the block next to the file intersection is set at the block position register 16. In this operation, block data is not transferred to the CPU.

FIG. 6 is a flow chart showing the procedure of recording in one sector a plurality of blocks whose write instructions are chained within the maximum length of data field 4 in one sector. The procedure can be readily understood from this flow chart so that the description therefor is omitted.

According to the foregoing description, this invention, is effective in that variable length data can be recorded in and read from a recording medium, such as an optical disk having a plurality of fixed length recording units (sectors).

I claim:

1. A data recording system for recording data blocks having a variable length in recording units each having a fixed length, comprising:
   a recording medium having a plurality of fixed length recording units each composed of at least one data field in which data is recorded and an associated data recording information field in which data recording information is recorded; and
   means for recording data in the data field and associated data recording information in the data recording information field of a fixed length recording unit;
   wherein said data recording information comprises:
   a data flag indicating if data has been recorded in said recording unit; and
   a data length field, separate from said data flag, indicating in length units the length of data forming a data block or a portion of a data block recorded in said recording unit.

2. A data recording system according to claim 1, wherein said data recording information field further comprises a last flag indicating the last recording unit of said plurality of recording units over which one data block is divisionally recorded.

3. A data recording system for recording data blocks having a variable length in recording units each having a fixed length, comprising:
   a recording medium having a plurality of fixed length recording units each composed of at least one data field in which data is recorded and an associated data recording information field in which data recording information is recorded; and
   means for recording data in the data field and associated data recording information in the data recording information field of a fixed length recording unit;
   wherein said data recording information comprises:
   a data flag indicating if data has been recorded in said recording unit; and
   a data length field indicating in length units the length of data forming a data block or a portion of a data clock recorded in said recording unit;
   wherein said recording means comprises means for recording a plurality of data blocks, each including a data field and an associated data recording information field, in a single fixed length recording unit.

4. A data recording system according to claim 1, wherein said data recording information field further comprises a mark flag indicating an intersection between data.

5. A data recording system according to claim 4, wherein said mark flag is composed of two bits, one bit indicating an intersection between data and the other bit at least indicating an intersection between files.

6. A data recording and reading system comprising:
   a recording medium having a plurality of fixed length recording units each composed of a data field in which data is recorded and a data recording information field in which data recording information is recorded;
   means for recording data and associated data recording information in said fixed length recording unit; and
   means for reading data recorded in said recording medium;
   wherein said data recording information field comprises:
   (a) a data flag indicating if data has been recorded in said recording unit; and
   (b) a data length field indicating the length of data recorded in said recording unit;
   wherein said reading means comprises:
   (a) a data storage unit for storing data read from said recording medium;
   (b) a transfer address unit for storing the address of data destination;
   (c) a transfer counter for storing length of data to be transferred to said destination; and
   (d) a transfer control unit for controlling data transfer to said destination; and
   (e) a controller for storing destination and data length from the data stored in said data storage unit in said transfer address unit and said transfer counter, respectively, to control operation of said transfer controller.

7. A data recording system according to claim 6, wherein said data recording information field further comprises a last flag indicating the last recording unit of said plurality of recording units over which one data block is divisionally recorded.

8. A data recording and reading system comprising:
a recording medium having a plurality of fixed length recording units each composed of a data field in which data is recorded and a data recording information field in which data recording information is recorded;
means for recording data and associated data recording information in said fixed length recording unit; and
means for reading data recorded in said recording medium;
wherein said data recording information field comprises:
(a) a data flag inidicating if data has been recorded in said recording unit; and
(b) a data length field indicating the length of data recorded in said recording unit;
wherein said reading means comprises:
(a) a data storage unit for storing data read from said recording medium;
(b) a transfer address unit for storing the address of data destination;
(c) a transfer counter for storing length of data to be transferred to said destination; and
(d) a transfer control unit for controlling data transfer to said destination; and
(e) a controller for storing destination and data length from the data stored in said data storage unit in said transfer address unit and said transfer counter, respectively, to control operation of said transfer controller;
wherein said recording means comprises means for recording a plurality of data blocks, each including a data field and an associated data recording information field, in a single fixed length recording unit.

9. A data recording system according to claim 6, wherein said data recording information field further comprises a mark flag indicating an intersection between data.

10. A data recording system according to claim 9, wherein said mark flag is composed of two bits, one bit indicating an intersection between data and the other bit at least indicating an intersection between files.

11. A method for recording and reproducing data in a plurality of successive fixed length recording units each having a data field and a flag field comprising the steps of:
divisionally recording a series of variable length data in the data fields of said plurality of recording units;
in the flag field of each of the plurality of recording units, recording information indicative of the length of data recorded in the data field of each of the plurality of recording units;
in the flag field of a last recording unit of the plurality of the recording units where data is recorded, recording last flag information indicating that the recording unit is a last recording unit of a plurality of recording units in which said series of data has been divisionally recorded;
reading out the series of data from the data fields of said plurality of recording units and reading out said data length information and said last flag information from the corresponding flag fields;
counting the data length information read out to obtain the length of said series of data; and
transferring said read-out series of data to a data processing unit as one block of data.

12. A method for recording and reproducing data according to claim 11, further comprising the step of temporarily storing said read-out series of data, data length information and last flag information in a data storage unit.

13. A method for recording and reproducing data in a plurality of successive fixed length recording units each having a data field and a flag field comprising the steps of:
divisionally recording a series of variable length data in the data fields of said plurality of recording units;
in the flag field of each of the plurality of recording units, recording information indicative of the length of data recorded in the data field of each of the plurality of recording units;
in the flag field of a last recording unit of the plurality of the recording units where data is recorded, recording last flag information indicating that the recording unit is a last recording unit of a plurality of recording units in which said series of data has been divisionally recorded;
reading out the series of data from the data fields of said plurality of recording units and reading out said data length information and said last flag information from the corresponding flag fields;
counting the data length information read out to obtain the length of said series of data;
transferring said read-out series of data to a data processing unit as one block of data; and
recording a mark flag indicative of an intersection between data in each of the flag fields of said recording units.

14. A method for recording and reproducing data according to claim 13, wherein said mark flag is composed of two bits, one bit indicating an intersection between data and the other bit being used at least as a flag indicating an intersection between files.

15. A data recording system for recording data having a variable length in recording units each having a fixed length, comprising:
a recording medium having a plurality of fixed length recording units each composed of a data field in which data is recorded and a data recording information field in which data recording information is recorded; and
means for recording data and associated data recording information in said fixed recording unit;
wherein said data recording information field comprises:
(a) a data flag indicating if data has been recorded in said recording units;
(b) a mark flag indicating an intersection between data or the end of a file; and
(c) a data length field indicating in length units the length of data recorded in said recording unit.

16. A data recording system according to claim 15, wherein said data recording information field further comprises a last flag indicating the last recording unit of said plurality of recording units over which one data block is divisionally recorded.

17. A data recording system for recording data having a variable length in recording units each having a fixed length, comprising:
- a recording medium having a plurality of fixed length recording units each composed of a data field in which data is recorded and a data recording information field in which data recording information is recorded; and
- means for recording data and associated data recording information in said fixed recording unit;

wherein said data recording information field comprises:

(a) a data flag indicating if data has been recorded in said recording units;

(b) a mark flag indicating an intersection between data or the end of a file;

(c) a data length field indicating in length units the length of data recorded in said recording unit; and (d) a last flag indicating the last recording unit of said plurality of recording units over which one data block is divisionally recorded;

wherein said recording means comprises means for recording a plurality of data blocks, each including a data field and an associated data recording information field, in a single fixed length recording unit.

18. A data recording system according to claim 15, wherein said mark flag is composed of two bits, one bit indicating an intersection between data and the other bit at least indicating an intersection between files.

* * * * *